United States Patent [19]

Hughes

[11] Patent Number: 5,503,111
[45] Date of Patent: *Apr. 2, 1996

[54] ANIMAL DROSS ABSORBENT AND METHOD

[75] Inventor: John Hughes, Long Grove, Ill.

[73] Assignee: American Colloid Company, Arlington Heights, Ill.

[ * ] Notice: The term of this patent shall not extend beyond the expiration date of Pat. No. 5,129,365.

[21] Appl. No.: 192,020

[22] Filed: Feb. 4, 1994

Related U.S. Application Data

[63] Continuation of Ser. No. 880,580, May 8, 1992, Pat. No. 5,317,990, which is a continuation of Ser. No. 552,823, Jul. 16, 1990, Pat. No. 5,129,365, which is a continuation-in-part of Ser. No. 423,193, Oct. 18, 1989, Pat. No. 5,386,803, which is a continuation-in-part of Ser. No. 297,471, Jan. 13, 1989, Pat. No. 5,000,115.

[51] Int. Cl.6 ................................................ A01K 1/015
[52] U.S. Cl. ............................................................ 119/173
[58] Field of Search ................................ 119/171, 172, 119/173

[56] References Cited

U.S. PATENT DOCUMENTS

| | | | |
|---|---|---|---|
| 2,649,759 | 8/1953 | Gibbs | 119/1 |
| 3,286,691 | 11/1966 | McFadden | 119/1 |

(List continued on next page.)

FOREIGN PATENT DOCUMENTS

| | | | |
|---|---|---|---|
| 0087001 | 8/1983 | European Pat. Off. . | |
| 0242478 | 10/1987 | European Pat. Off. . | |
| 0378421 | 7/1990 | European Pat. Off. . | |
| 0424001 | 4/1991 | European Pat. Off. . | |
| 2369868 | 8/1978 | France . | |
| 3620447 | 12/1987 | Germany | 119/173 |
| 58009626 | 7/1981 | Japan . | |
| 0094043 | 5/1985 | Japan | 119/173 |
| 1119127 | 6/1986 | Japan | 119/1 |
| 2239932 | 10/1987 | Japan | 119/173 |
| 1191626 | 1/1988 | Japan . | |
| 3044822 | 2/1988 | Japan | 119/1 |
| 3044823 | 2/1988 | Japan | 119/173 |
| 3185323 | 7/1988 | Japan | 119/173 |
| 3219323 | 9/1988 | Japan | 119/171 |
| 2172781 | 10/1986 | United Kingdom . | |

OTHER PUBLICATIONS

Opposition Annex filed by Sivomatic BV in opposition to grant of European Patent No. 0 424 001 of American Colloid Company. (Date of mention of the grant in the European Patent Bulletin 30 Mar. 1994 94/13.)

Translation of Opposition dated 14 Dec. 1994 filed by Süd–Chemie AG in opposition to grant of European Patent No. 0 424 001 of American Colloid Company.

(List continued on next page.)

*Primary Examiner*—John G. Weiss
*Attorney, Agent, or Firm*—Marshall, O'Toole, Gerstein, Murray & Borun

[57] ABSTRACT

A composition and method of absorbing animal dross. In one embodiment, the composition comprises discrete particles (about 50 microns to about 3350 microns, preferably about 600 microns to about 3350 microns in size) of a non-compacted water-swellable bentonite clay that effectively absorbs animal dross and simultaneously agglomerates into a sufficiently large and stable mass, thereby permitting physical separation of the soiled and wetted water-swellable bentonite clay particles from discrete particles of the unsoiled and unwetted water-swellable bentonite clay even after partial drying of about 1 to about 24 hours at room temperature, without substantial sticking to animal paws and fur. In another embodiment, the composition comprises discrete particles of a combination of non-compacted water-swellable sodium bentonite clay and calcium bentonite clay that effectively absorbs animal dross and simultaneously agglomerates into a water-dispersible but physically stable mass, thereby permitting physical separation of the soiled and wetted bentonite clay particles from discrete particles of the unsoiled and unwetted water-swellable bentonite clay, and has sufficient water-dispersibility for disposal through a household plumbing or sewer conduit without clogging.

31 Claims, 1 Drawing Sheet

U.S. PATENT DOCUMENTS

| | | | |
|---|---|---|---|
| 3,765,371 | 10/1973 | Fisher | 119/1 |
| 4,009,684 | 3/1977 | Kliment et al. | 119/1 |
| 4,275,684 | 6/1981 | Kramer et al. | 119/1 |
| 4,315,761 | 2/1982 | Larrson et al. | 71/21 |
| 4,343,751 | 8/1982 | Kumar | 264/37 |
| 4,395,357 | 7/1983 | Kramer et al. | 252/428 |
| 4,409,925 | 10/1983 | Brundett et al. | 119/1 |
| 4,459,368 | 7/1984 | Jaffee et al. | 502/80 |
| 4,494,481 | 1/1985 | Rodriguez et al. | 119/1 |
| 4,494,482 | 1/1985 | Arnold | 119/1 |
| 4,506,628 | 3/1985 | Stockel | 119/1 |
| 4,532,890 | 8/1985 | Ohki et al. | 119/1 |
| 4,570,573 | 2/1986 | Lohman | 119/1 |
| 4,591,581 | 5/1986 | Crampton et al. | 502/407 |
| 4,638,763 | 1/1987 | Greenberg | 119/1 |
| 4,641,605 | 2/1987 | Gordon | 119/1 |
| 4,657,881 | 4/1987 | Crampton et al. | 502/80 |
| 4,671,208 | 6/1987 | Smith | 119/1 |
| 4,685,420 | 8/1987 | Stuart | 119/1 |
| 4,686,937 | 8/1987 | Rosenfeld | 119/1 |
| 4,844,010 | 7/1989 | Ducharme et al. | 119/1 |
| 5,062,383 | 11/1991 | Nelson | 119/1 |

OTHER PUBLICATIONS

Opposition dated 21st Dec. 1994 filed by IKO–Erbslöh Industriemineralien und Kohlenstoffe GmbH & Co. KG in opposition to grant of European Patent No. 0 424 001 of American Colloid Company.

Opposition dated 22 Dec. 1994 filed by Laporte Industries Limited in opposition to grant of European Patent No. 0 424 001 of American Colloid Company.

Opposition dated 21 Dec. 1994 filed by Redland Minerals Limited in opposition to grant of European Patent No. 0 424 001 of American Colloid Company.

Opposition dated 30 Dec. 1994 filed by Bentonite Corporation in opposition to grant European Patent No. 0 424 001 of American Colloid Company.

Notice of Opposition dated Dec. 27, 1994 filed by Skamol A/S in opposition to grant European Patent No. 0 424 001 of American Colloid Company.

Annex 1—Opposition filed by Laviosa Chimica Mineraria S.p.A. in opposition to grant of European Patent No. 0 424 001 of American Colloid Company.

Facts and Arguments—Opposition filed by Tolsa, S. A. in opposition to grant of European Patent No. 0 424 001 of American Colloid Company.

Letter dated 22nd Dec. 1994 from Macromin Ltd. regarding observation of opposition to grant of European Patent No. 0 424 001 of American Colloid Company.

Letter dated Sep. 20, 1994 from Mars Incorporated to Mr. John Hughes, President and Chief Executive Officer of American Colloid Company regarding European Patent No. 0 424 001 of American Colloid Company.

Ullmanns Encyklopädie der technischen Chemie, 4., neubearbeitete und erweiterte Auflage, Band 23, Textilhilfsmittel bis Vulkanfiber, Verlag Chemie, 1983 (pp. 310–327) (English translation of pp. 322–325 attached).

Industrial Minerals, Jun. 1989—"Industrial Clays A special review," edited by Gerry Clarke (p. 56).

Applied Clay Mineralogy, 1962, by Ralph E. Grim, (pp. 246–251 and 16–17).

Minerals of the Montmorillonite Group Their Origin and Relation to Soils and Clays, 1943–4, by Clarence S. Ross and Sterling B. Hendricks (pp. 52–54).

Materials and Technology, 1971, vol. II "Non–metallic ores, silicate industries, and solid mineral fuels", (p. 51).

Volclay Sales Brochure, 1962, of American Colloid Company.

Technical Information Document entitled "SY 410 Granules" published and distributed publicly by Laporte Industries Limited of London, England (Mar. 8, 1982).

Industrial Materials, Jun. 1989—"Industrial Clays A special review" edited by Gerry Clarke (p. 59).

Affidavit of Christopher J. Watkins dated 21 Dec. 1994 (filed in the Opposition by Redland Minerals Limited).

Industrial Minerals, Dec. 1972, "Calcium and Sodium Bentonite, Uses and Consumption" (pp. 21–36).

Product literature disseminated by Wundpets of Reading Berkshire (UK), "Together" Issue No. 32, dated Oct./Nov. 1986.

Roskill: "The Economics of Bentonite, Fuller's Earth and Allied Clays" 1989, Sixth Edition (p. 17).

Kline & Co. report entitled "An Analysis of the US Market for Specialty Clays" publication date unknown but mentioned in Chemical Marketing Reporter published Jun. 12, 1989 (pp. 9–1 to 9–10).

Declaration of Raymond H. J. Paris dated Oct. 18, 1991 (filed in Opposition by Bentonite Corporation).

1987 Annual Report of American Colloid Company (1987) ("Supplying Specialty Minerals To Worldwide Industrial Markets").

Affidavit of Steven R. Gray dated Dec. 14, 1994 (filed in Opposition by Bentonite Corporation).

Affidavit of Marshal Sudrala dated Dec. 14, 1994 (filed in Opposition by Bentonite Corporation).

American Colloid Company letter dated Sep. 22, 1982 and two (2) enclosures.

American Colloid Company Volclay Panels® Bentonite Waterproofing Systems Data Sheet entitled "High–Security Waterproofing for Below Grade Structures" dated Jan. 1982.

American Colloid Company Data Sheet entitled "Asphalt Emulsion Granular" dated Mar. 9, 1989.

American Colloid Data Sheet entitled "Volclay KWK Food Grade" dated Apr. 1, 1989.

American Colloid Company Letter to Customer dated Dec. 22, 1987.

"Composition and Properties of Oil Well Drilling Fluids", Fourth Edition, 1980, by George R. Gray, et al. (pp. 146 and 538).

Stoberibogen II, Fagbog for Jern–, STÅ–OG Metalstobere, 1956 (p. 63).

Applied Clay Science, 2 (1987) "A New Bentonite Deposit in Sardinia" by A. Pietracaprima, et al. (pp. 167–174).

Some invoices issued by Laviosa (Opponent) for the sale of natural sodium bentonite based cat litter.

Agreement between Laviosa and Herz Pflege Haustier- -Produkte AG (w/translation from Italian to English).

Heavyweight Versus Lightweight as published in Pet Product Marketing, Oct. 1988 disclosing clumpability of calcium montmorillonites (the better one) and of potassium and sodium montmorillonites whereby bad smells are eliminated and the clumps may be easily removed from the unsoiled litter; and advertisement on the right–hand bottom side referring to Pettex Grey Litter as a clump–forming pet litter based on bentonite. (Attached to Opposition filed by Tolsa, S. A.).

Datos De Control De Calidad sheet as a summary of the opponents test results concerning a continuous watch being made with regard to the pet litters of its competitors, as well as copies of the pages of the laboratory book corresponding to the products mentioned in the summary. Also, photocopies of the labels appearing on the recipients corresponding to the various products marked with an "*" in the summary are submitted herewith as documents D10–1 through D10–9. (Attached to Opposition filed by Tolsa, S. A.).

Letter dated Dec. 6, 1994 from Richard H. Anderson (patent attorney for American Colloid Company) to Mr. Michael J. O'Driscoll at Metal Bulletin plc. regarding chart which appears at p. 45 of article that appeared in the Jul. 1988 issue of Industrial Minerals.

Facsimile letter dated 20 Dec. 1994 from Mike O'Driscoll to R. H. Anderson regarding sodium bentonite as cat litter in response to document C70.

Newspaper article entitled "Clumping, or the absorbing story of cat litter" from The Independent, 4th Jul. 1989 by Jim White (attached to Opposition filed by Laporte Industries Ltd.).

"Smectite Clay Minerals: Properties and Uses," by I. E. Odom (pp. 171–189).

Preprint from the 1977 Bureau of Mines Minerals Yearbook of the United States Department of the Interior, Bureau of Mines. The chapter is entitled "CLAYS" by Sarkis G. Ampian (pp. 1–34).

Industrial Minerals Jul. 1988—"Bentonite Overcapacity in Need of Markets," by Mike O'Driscoll, Associate American Editor (pp. 43–67).

Copy of "Kitten Kaboodle" bag, published Jan., 1990 by Kolclay Products.

Excerpts from Rex W. Grimshaw, *The Chemistry and Physics of Clays,* 4th Ed. (1971).

Excerpt from *Cats Magazine,* Sep. 1989, Regarding EVERCLEAN® Product.

Article: *Litter That's Less Work,* New York Times, Mar. 18, 1989, Regarding EVERCLEAN® Product.

Excerpt from *Cats Magazine,* May 1990: Advertisement for EVERCLEAN® product.

Excerpt from *Cats Magazine,* Sep., 1990: Advertisement for EVERCLEAN® product.

Excerpt from *Cats Magazine,* Aug., 1990, regarding EVERCLEAN® product.

*Summary Report of Investigations Made by the Mine's Branch During the Calendar Year Ending Dec. 31, 1921,* Regarding Properties of Bentonite.

*Cats Magazine* Article on Edward Lowe, Stating That Use of Clay for Cat Litter Was Discovered by Lowe in 1947.

Excerpts from *Minerals Yearbook,* vol. 1, United States Department of the Interior, 1985, Showing Use of Montmorillonite Clays as Pet Waste Absorbents in 1984–85.Excerpts from J. S. Ross, *Bentonite in Canada,* Department of Mines and Technical Surveys, Mines Branch, Ottowa, 1964. Discusses: Hygroscopic Nature of Bentonite and Its Affinity for Liquids (p. 15), Use of Bentonite for Absorbing Liquids in Animal Bedding (p. 23), Greater Dry Strength of Bentonite Along with Attapulgite, When Compared with Other Clays (p. 11).

Canada Department of Mines, Mines Branch Report: *Investigations of Mineral Resources and the Mining Industry,* 1930. Discusses: Absorptive and Absorptive Properties of Bentonite (p. 13), Use of Bentonite as an Absorptive (p. 15).

*Canadian Minerals Yearbook,* 1980, pp. 65–68. Discusses Highly Sorptive Properties of Bentonite and Suitability for Use As Pet Litter.

*Canadian Minerals Yearbook,* 1985, pp. 11.1–11.2. Discusses Highly Sorptive Properties of Bentonite and Suitability for Use As Pet Litter.

Excerpts from *Minerals Yearbook,* vol. 1, United States Department of the Interior, 1987, Showing Use of Fuller's Earth as Pet Waste Absorbents (Table 18, p. 251).

Excerpts from Clay Minerals Yearbook, vol. 1, United States Department of the Interior, Bureau of Mines, 1988. Tables 16, 18, and 20 (pp. 265, 267, 271, respectively) Show Use of Bentonite and Fuller's Earth as Pet Waste Absorbents.

Letter dated Jul. 4, 1986 from Robert W. Graul to John Hughes with enclosure of report prepared by Robert Beamish on May 23, 1986 entitled "A Feasability and Marketing Study of Sodium Montmorillonite Cat Litter".

Letter dated Aug. 20, 1986 from John Hughes to Robert W. Graul.

Condensed Transcript and Concordance prepared by M & M Court Reporting Service, Inc. of the Deposition of Glen Teague on Oct. 21, 1993 (p. 2 to p. 73).

Condensed Transcript and Concordance prepared by M & M Court Reporting Service, Inc. of the Deposition of Phillip Webb on Oct. 21, 1993 (p. 2 to p. 32).

Transcript prepared by M & M Court Reporting Service, Inc. of the Telephonic Deposition of Dorothy Webb on Dec. 9, 1993 (p. 1 to p. 18).

Special Paper 20 Bentonite in Oregon: Occurrences, Analyses, and Economic Potential Date: Apr. 28, 1989.

Declaration of Ronald P. Geitey Dated: May 17, 1993.

Affidavit of Edgar Odom, Ph.D. Dated: Mar. 21, 1994.

Canadian Trademark Registration for Everclean®, stating that Everclean® product has been sold in Canada under the Everclean® name since at least Dec. 1988.

Copy of page from U.S. Trademark Report indicating first use in commerce date of Oct. 22, 1987 for Everclean®.

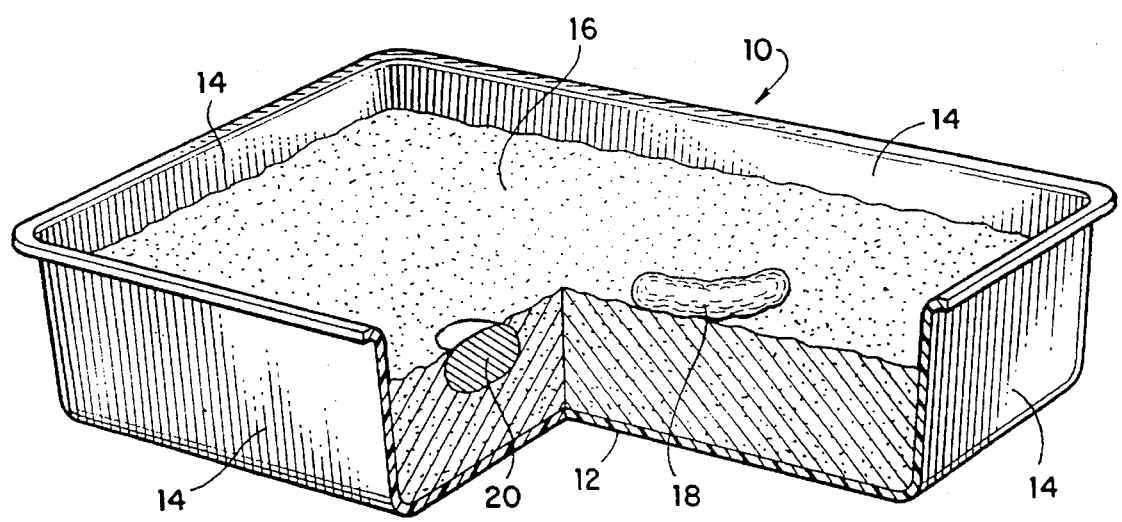

ANIMAL DROSS ABSORBENT AND METHOD

CROSS-REFERENCE TO RELATED APPLICATIONS

This application is a continuation of application Ser. No. 07/880,580, filed May 8, 1992 now U.S. Pat. No. 5,317,990 which is a continuation of application Ser. No. 07/552,823, filed Jul. 16, 1990, U.S. Pat. No. 5,129,365 which is a continuation-in-part of application Ser. No. 07/423,193, filed Oct. 18, 1989, U.S. Pat. No. 5,386,803, which is a continuation-in-part of application Ser. No. 07/297,471 filed Jan. 13, 1989. U.S. Pat. No. 5,000,115 reissued as U.S. Pat. No. RE 33,983.

FIELD OF THE INVENTION

The present invention relates to an absorbent composition for animal dross and its method of use. More particularly, the present invention relates to a composition comprising a water-swellable bentonite clay, such as sodium bentonite and/or calcium bentonite. Discrete particles of the water-swellable bentonite clay effectively absorb animal dross and simultaneously agglomerate into a sufficiently large and stable mass, such that the wetted mass of absorbent composition can be separated from unwetted particles of the composition and removed from a litter box, even after partial or complete drying of the clay, without sticking to the animal's paws or fur. In another embodiment of the present invention, the composition includes a combination of sodium bentonite, in an amount of about 1% to about 50% by weight, based on the total clay content, dry basis; and about 50% to about 99% calcium bentonite by weight, based on the total clay content, dry basis. Discrete particles of the combination of bentonite clays effectively absorb animal dross and simultaneously agglomerate into a sufficiently large and stable mass, such that the wetted mass of absorbent composition can be separated from unwetted particles of the composition and removed from a litter box, without sticking to the animal's paws or fur. Further, the combination of sodium bentonite and calcium bentonite enables the dross-soaked agglomerates to readily and unexpectedly disperse in water so that the agglomerates can be dispersed in toilet water without mixing or other mechanical separation steps, or disposed of through a household plumbing line without clogging the toilet or other household plumbing lines. Consequently, odors emanating from the litter box are reduced or eliminated, and cost savings are achieved because the unsoiled contents of the litter box do not have to be discarded together with the soiled portion of the litter on a periodic basis.

BACKGROUND OF THE INVENTION AND PRIOR ART

House-broken animals, such as cats, are trained into the habit of urinating and defecating in a specially provided litter box. Similarly, untrained and caged animals, such as guinea pigs, urinate and defecate on the floor of their cage, often in approximately the same floor area of the cage. Consequently, pet owner, homeowners, veterinarians and laboratory personnel have added absorbent materials to the litter box or cage to collect the urine and feces. After a relatively short period of time, the dross soiled absorbent emits objectionable odors because of the presence of the urine and fecal matter.

In order to reduce or eliminate these objectionable odors, homeowners periodically remove the fecal matter from the litter absorbent physically. However, physical removal of the feces does not reduce or eliminate odors caused by the urine absorbed into the absorbent. Therefore, when the odors caused by the absorbed urine become intolerable, the homeowner discards the litter box absorbent material entirely. The homeowner then washes the litter box and refills the litter box with fresh litter box absorbent material. These activities are unpleasant, time-consuming and expensive. Consequently, the litter box absorbent material usually is a relatively inexpensive solid absorbent material, such that an individual cleaning of the litter box is not particularly economically burdensome. However, repeated litter box cleanings over a period of time accounts for relatively large expenditures.

The most commonly used litter box absorbent materials are inexpensive clays, such as calcined clays, that are safe and non-irritating to the animals, and that absorb relatively substantial amounts of liquids. Other porous, solid litter box absorbent materials, that are used alone or in combination, include straw, sawdust, wood chips, wood shavings, porous polymeric beads, shredded paper, sand, bark, cloth, ground corn husks, cellulose, and water-insoluble inorganic salts, such as calcium sulfate. Each of these absorbent materials has the advantage of low cost, but each suffers from the disadvantage of merely absorbing a liquid waste product and holding the product within its porous matrices, or, in the case of sand, absorbing the liquid dross on its surface. For each absorbent material, offensive odors are eventually caused by the absorbed urine, and the entire contents of the litter box, including soiled absorbent material and unsoiled absorbent material, has to be discarded.

One such litter box absorbent material is described in Lohman U.S. Pat. No. 4,570,573. The Lohman patent is directed to an animal litter composition comprising about 60–94% by weight paper, about 1–35% calcium sulfate and about 3–12% water. Such an absorbent is effective in collecting animal dross, but it does not reduce or eliminate the generation of objectionable odors and does not eliminate the disadvantage of periodically replacing the entire contents of the litter box. Larson et al in U.S. Pat. No. 4,315,761 describes the use of aerated or foaming concrete, of relatively large size, for example, up to 10 mm (millimeters), to absorb animal dross and facilitate removal of the excrement from a litter box. The aerated concrete merely absorbs the animal dross, and therefore suffers from the identical drawback of present day animal litter box compounds, i.e., an inability to easily separate the soiled absorbent particles from the unsoiled absorbent particles without having to clear and clean the entire litter box.

Stuart, in U.S. Pat. No. 4,685,420, discloses an improved litter box absorbent composition comprising from 0.01% to 5.0% by weight of a water-absorbing polyacrylate in combination with a common litter box absorbent material. According to the method and composition of Stuart, the polyacrylate and absorbent material absorb the urine or similar waste material, and the polyacrylates act to gel the soiled litter box absorbent material into a gelled product. Stuart teaches that the gelled absorbent material then can be physically removed from the litter box to reduce the generation of offensive odors, and to avoid discarding the unsoiled portion of the absorbent material. However, the method and composition of Stuart suffers from the disadvantage of relative cost ineffectiveness. The commonly used litter box absorbent materials are very inexpensive materials, whereas the water-absorbent polymers of Stuart are relatively expensive products that can raise the initial cost of the litter box absorbent material to an unacceptable level in a very cost competitive market.

Other litter box absorbent materials are disclosed by Fisher in U.S. Pat. No. 3,765,371 describing a foamed plastic for absorbing and/or absorbing animal dross; by Kramer et al in U.S. Pat. Nos. 4,275,684 and 4,395,357 describing calcium silicate as an animal litter box absorbent material and specifically teaching against the use of mineral products, such as clay-type minerals, because of mineral product's tendency to swell upon liquid absorption; by Rodriguez et al in U.S. Pat. No. 4,494,481 describing the addition of a transmission metal of Group Ib or IIb of the periodic table to present-day litter box absorbent materials to prevent the development of urine odors; and by Greenberg in U.S. Pat. No. 4,638,763 describing the addition of sodium sulfate to a litter box absorbent material to facilitate removal of soiled absorbent from the litter box.

Unicharm KK Japanese application J63044-822-A discloses a clay pet litter containing an organic acid and its salt as a deodorant. The clay litter of the present invention is natural clay, as mined and ground, that functions to agglomerate liquid animal dross for effective removal of the used liquid-soaked litter without organic acid or other chemical treatments.

Kenkyu Japanese application J6 1119-127-A discloses spraying a cyanoacrylic acid alkyl ester film on the surface of pet feces for removal of the feces separately from the litter.

Crampton et al U.S. Pat. No. 4,657,881 teaches a pet litter formed from compacted fines of bentonite clay or other clays such that after compaction, the clay particles have a size of 710 microns to 4 millimeters. Such compacted clays have been found to be very adherent to an animal's paws and fur after wetting.

In accordance with the present invention, it has been found that the compaction of fine particles into larger particles within applicant's preferred particle size range of about 600 microns to about 3350 microns produces a pet litter that is muddy when wetted, apparently due to particle size breakdown upon wetting, and incapable of quick absorption of liquid to form cohesive, non-sticky masses even after partial drying, e.g. 12–24 hours at room temperature, so that the wetted animal dross-soaked litter when compacted, is often removed from the litter box by the animal's paws and fur necessitating frequent and irritating household cleaning. To achieve the full advantage of the present invention, the water-swellable clay used as a pet litter material in accordance with the present invention should have a particle size within the range of about 50 microns to about 3350 microns, and preferably 600 microns to about 3350 and should not be compacted from finer particles.

Therefore, a need exists for a litter box absorbent material that effectively collects the urine or other dross material of house-broken pets and caged animals; that agglomerates when wetted to allow physical removal of the wetted litter box absorbent material from unwetted litter box absorbent material in order to reduce or eliminate dross-based odors and to reduce costs associated with animal litter box absorbent materials; that will be relatively non sticky when wetted by animal dross to form a cohesive mass that will not stick substantially to the animal so that it can be retained within the litter box as a cohesive non-muddy mass until removed by the animal's caretaker; that will be relatively non sticky when wetted by animal dross to form a cohesive mass that will not stick substantially to the animal so that it can be retained within the litter box as a cohesive non-muddy mass until removed by the animal's caretaker; that is capable of spontaneous dispersion in water after agglomeration so that the material can be discarded to a household waste or storm sewer line, for example, by flushing the dross-soaked, dispersed agglomerates down a household toilet, without clogging plumbing lines; and that is sufficiently economical for practical use in a highly competitive and cost conscious market. Surprisingly and unexpectedly, it has been found that non-compacted water-swellable bentonite clays having a particle size in the range of about 50 microns to about 3350 microns, and preferably about 600 microns to about 3350 microns effectively absorb animal dross, and during absorption of the animal dross, agglomerate into a sufficiently large, stable and non-sticky mass for physical separation of the liquid dross-soiled portion of the litter box absorbent material from the unused portion of the litter box absorbent material even after partial drying e.g. 1 to 24 hours at room temperature, and remains cohesive and non-adherent to the animal even after a 24 hour drying period at room temperature. The water-swellable bentonite clays, and their absorbent and agglomerating properties, effectively reduce or eliminate odors associated with animal dross; reduce costs associated with litter box absorbent material replacement; and are sufficiently economical to compete effectively in a highly competitive and cost conscious industry.

In another embodiment, it has been found that a combination of non-compacted sodium bentonite, in an amount of about 1% to about 50% by weight, and calcium bentonite, either compacted or non-compacted, in an amount of about 50% to about 99%, by weight, based on the total weight of clay in the composition, effectively absorbs animal dross, and during absorption of the animal dross, agglomerates into a sufficiently large and stable mass for physical separation of the soiled portion of the litter box absorbent material from the unused portion of the litter box absorbent material, such that the agglomerates readily and spontaneously disperse in water for disposal through a household sewer conduit. To achieve the full advantage of this clay mixture embodiment of the present invention, the combination of sodium bentonite and calcium bentonite clays should have a particle size in the range of about 50 microns to about 3350 microns, and preferably about 600 microns to about 3350 microns.

SUMMARY OF THE INVENTION

In brief, the present invention is directed to a composition and method of absorbing animal dross. In one embodiment, the composition comprises discrete particles (about 50 microns to about 3350 microns, preferably about 600 microns to about 3350 microns in size) of a non-compacted water-swellable bentonite clay that effectively absorbs animal dross and simultaneously agglomerates into a sufficiently large, stable mass that is essentially non-adherent to pet animal's body particularly a cat, thereby permitting physical separation of the soiled and wetted water-swellable bentonite clay particles from discrete particles of the unsoiled and unwetted water-swellable bentonite clay, even after partial drying of about 1 to about 24 hours at room temperature. The cohesive masses formed after wetting the clay particles with liquid animal dross are relatively dry feeling on the outer surfaces so that they do not adhere to animal paws or fur. In another embodiment, the composition comprises discrete particles of a combination of non-compacted water-swellable sodium bentonite clay and calcium bentonite clay that effectively absorbs animal dross and simultaneously agglomerates into a water-dispersible but physically stable mass, thereby permitting physical separation of the soiled and wetted bentonite clay particles from discrete particles of the unsoiled and unwetted water-swellable bentonite clay, and has sufficient water-dispersibility for disposal through a household plumbing or sewer conduit without clogging.

Therefore, one aspect of the present invention is to provide an improved absorbent composition for animal waste products and related waste products.

Another aspect of the present invention is to provide a composition that effectively absorbs liquid animal dross and simultaneously agglomerates into a mass of sufficient size and cohesive strength for physical removal from unwetted litter box absorbent composition.

Another aspect of the present invention is to provide a composition that effectively absorbs liquid while having a relatively dry, non-adherent surface so that the cohesive masses formed eliminate or reduce odors associated with animal dross deposited in a litter box.

Another object of the present invention is to provide a composition that economically eliminates or reduces odors associated with animal dross deposited in a litter box.

Another aspect of the present invention is to provide a composition that facilitates and reduces cleaning and maintenance of animal litter boxes and animal cages.

Still another aspect of the present invention is to provide a composition that overcomes the disadvantages of prior art animal litter box absorbent compositions and that is economically competitive with prior art litter box absorbents.

Another aspect of the present invention is to provide a composition for absorbing animal dross such that the physical removal of urine from an animal litter box is achieved without forming animal-adherent masses.

Another aspect of the present invention is to provide a method of effectively absorbing animal dross with a composition comprising a non-compacted water-swellable bentonite clay having a particle size of about 50 microns to about 3350 microns, preferably about 600 microns to about 3350 microns that simultaneously agglomerates into a sufficiently large, non-adherent mass of sufficient strength upon absorbing the animal dross to permit physical separation of soiled and wetted bentonite clay particles from the unsoiled and unwetted bentonite clay particles, even after partial drying.

Another aspect of the present invention is to provide an animal dross-absorbent composition capable of agglomeration upon contact with animal dross, particularly animal urine, such that the agglomerates are capable of easy and spontaneous dispersion in water for disposal through a household plumbing conduit.

Another object of the present invention is to provide a method of effectively absorbing animal dross with a composition comprising a combination of a non-compacted water-swellable sodium bentonite clay and calcium bentonite clay that simultaneously agglomerate into a sufficiently large, essentially non-adherent mass of sufficient strength upon absorbing the animal dross to permit physical separation of soiled and wetted bentonite clay particles from the unsoiled and unwetted bentonite clay particles, such that the agglomerates are capable of being dispersed in water for periodic disposal through a household plumbing line without clogging.

The above and other objects and advantages of the present invention will become apparent from the following detailed description of the invention.

BRIEF DESCRIPTION OF THE DRAWING

The drawing is a perspective view of a receptacle including the absorbent composition of the present invention.

DETAILED DESCRIPTION OF THE INVENTION

In accordance with the method and composition of the present invention, water-swellable bentonite clays have been found useful as animal dross absorbents. The water-swellable bentonite clays of the present invention provide advantages over prior art animal litter box absorbent compositions in that the water-swellable bentonite clays are capable of absorbing several times their weight in liquid dross material and also are capable of simultaneously agglomerating to form a wetting mass of sufficient size and cohesive strength such that the soiled and wetted mass can be physically separated from the remaining unwetted water-swellable bentonite clay absorbent without adhering to animal paws and fur.

In accordance with another embodiment of the present invention, a combination of non-compacted water-swellable sodium bentonite clay and calcium bentonite clay, either compacted or non-compacted, have been found useful as animal dross absorbents. The combination of bentonite clays of the present invention provide advantages over prior art animal litter box absorbent compositions in that the bentonite clays are capable of absorbing several times their weight in liquid dross material and also are capable of simultaneously agglomerating and dispersing in water to form a wetted mass of sufficient size and cohesive strength such that the soiled and wetted mass can be physically separated from the remaining unwetted water-swellable bentonite clay absorbent and later dispersed in water for disposal through a household plumbing conduit. These properties of the water-swellable bentonite clays serve to reduce or eliminate odors resulting from urine-saturated litter box absorbents; to reduce the cost of using a litter box absorbent material because only soiled absorbent material is discarded; to reduce the number of times the litter box or animal cage must be completely cleaned; enable periodic disposal of the formed agglomerates through a household sewer conduit and the cohesive agglomerates are not sticky on their outer surfaces so that the clay does not substantially adhere to an animal's paws or fur. Furthermore, the water-swellable bentonite clays of the present invention provide these cost saving and work saving benefits without adding expensive supplementary compounds, such as water-absorbent polymers, acid or other organic compound additives that can prohibitively increase the cost of a product competing in a very cost-conscious market.

In accordance with an important feature of the present invention, non-compacted water-swellable bentonite clay provides an improved animal litter box absorbent composition. The water-swellable bentonite clays of the present invention absorb several times their own weight of an aqueous fluid, such as urine, and consequently swell. The wetted, swelled bentonite particles then interact with nearby wetted and swelled bentonite particles and agglomerate through physical and chemical interactions, such as hydrogen bonding and entanglement, to form a wetted mass of sufficient stability and size such that the mass can be removed from the unwetted particles of the water-swellable bentonite clay, even after partial drying at room temperature for periods of about 1 to about 24 hours, as normally would occur before removal of the soiled pet litter material. The cohesive masses formed after wetting the clay particles with liquid animal dross are relatively dry feeling on the outer surfaces so that they do not adhere to animal paws or fur. Unexpectedly, agglomerates that include both sodium bentonite and calcium bentonite then spontaneously disperse when contacted with water, such as in a toilet bowl, for disposal into a waste or storm sewer. The chemical and physical interactions that cause the wetted bentonite clay particles to agglomerate are not present when the bentonite clay particles are dry, hence separation of the wetted, swelled bentonite clay particles from the unwetted and unswelled bentonite clay particles are facilitated.

In practice, when an animal urinates on the litter box absorbent of the present invention, the urine is absorbed by the water-swellable bentonite to form an agglomerated mass of water-swellable bentonite and urine having a non-sticky dry feeling surface (non-muddy). This agglomerated mass has sufficient physical integrity to be removed from a litter box, or an animal cage, by using the implements and methods normally used to remove feces from a litter box and does not readily adhere to an animal's paws or fur. Therefore, the litter box absorbent composition of the present invention permits the animal owner or caretaker to employ the same removal techniques used to remove feces from the litter box to remove urine from the litter box. Before the method and composition of the present invention, it was not possible to mechanically remove urine from a litter box utilizing only one or more swellable clays as the absorbent because the urine soaked particles could not be differentiated from the unsoiled absorbent in the litter box.

In accordance with an important feature of the present invention, the water-swellable bentonite clay absorbent remaining in the litter box after removal of the urine-soaked and agglomerated bentonite clay still is available for future use. This portion of the litter box absorbent composition is still clean and useful, and does not contribute to the generation of noxious odors. In contrast, when using prior art litter box absorbents, such clean and useful absorbent material because no means existed to effectively separate the soiled absorbent from the fresh absorbent.

For example, the drawing shows a litter box 10 comprising a water-impermeable floor member 12 having integral, water-impermeable upstanding walls 14. The unsoiled absorbent composition 16, comprising a non-compacted water swellable bentonite clay in one embodiment, or a combination of sodium bentonite and calcium bentonite in a second embodiment, is placed in the litter box 10. In the second embodiment, the combination of water-swellable clays includes sodium bentonite clay, preferably non-compacted, in an amount of about 1% to about 50% based on the total dry clay weight in the absorbent composition, and calcium bentonite, either compacted or non-compacted, in an amount of about 50% to about 99% based on the total dry clay weight in the absorbent composition. Solid animal dross 18, such as fecal matter, is of sufficient mass and of sufficient cohesive strength to be physically removed from the litter box for ultimate disposal. Liquid animal dross, such as urine, vomit or blood, contacts the absorbent, water-swellable bentonite composition 16, causing the water-swellable bentonite to agglomerate into a soiled solid mass 20 of sufficient size and sufficient cohesive strength to allow physical removal of the soiled solid mass 20 from the remaining unsoiled absorbent composition 16. The remaining unsoiled absorbent composition 16 does not contribute to the generation of noxious odors and can remain in the litter box 10 for future use. Soiled solid mass 20 is discarded in an appropriate manner without the need of cleaning the entire litter box 10 and discarding its entire contents. In the second embodiment, the combination of sodium and calcium bentonites contained in the agglomerates unexpectedly disperse when contacted with water, so that the agglomerates can be disposed of down a household toilet or sink without clogging household plumbing conduits.

Therefore, and in accordance with another important feature of the present invention, the water-swellable bentonite clays provide a cost savings over the prior art litter box absorbents. First, cost savings are realized because unsoiled and unused absorbent composition is not discarded with the soiled absorbent composition. Secondly, surprisingly and unexpectedly, the water-swellable bentonite clays provide these cost-saving benefits without the addition of expensive polymeric or organic compounds that force the absorbent particles to gel into a removable physical mass. Therefore, utilizing the water-swellable bentonite clays of the present invention minimizes the raw material cost of the litter box absorbent composition in a cost competitive market.

The litter box absorbent composition of the present invention comprises, in one embodiment, a non-compacted water-swellable bentonite clay; and in a second embodiment, a combination of sodium and calcium bentonite clays. The use of bentonite clays in a variety of applications, such as a component in drilling muds, is well known. Bentonites are economical, readily available clays, with certain forms capable of hydrating and swelling in the presence of water. The swelling properties of bentonite are related to the exchangeable cations present in a particular bentonite ore. The water-swellable bentonite clays contain various exchangeable cations, including sodium, potassium, lithium, ammonium, calcium and magnesium. Although any of these cations can be the predominant exchangeable cation of the bentonite clay of the present invention, bentonite clays often include a variety of exchangeable cations.

The non-compacted water-swellable bentonite clays useful in the animal dross absorbent compositions of the first embodiment of the present invention include any water-swellable bentonite clay having a particle size within the range of about 50 microns to about 3350 microns, preferably about 600 to about 3350 microns that has not been compacted (pressurized such that two or more smaller particles are pressurized together to form a cohesive larger particle) and will hydrate in the presence of water, e.g., swell in the presence of water. The non-compacted bentonite clay can be any member of the dioctahedral or trioctahedral smectite group, or a mixture thereof. Examples include Montmorillonite, Beidellite, Nontronite, Hectorite and Saponite; or combinations thereof. The non-compacted bentonite clay of the present invention also can include Attapulgite or Sepiolite.

The clays useful in combination in accordance with the principles of the second embodiment of the present invention have sodium and calcium as the predominant exchangeable cations although these clays often include a variety of other exchangeable cations in a smaller amount. The remaining bentonite clays, containing predominantly other exchangeable cations, can be added as well, so long as the sodium bentonite, preferably non-compacted, comprises about 1% to about 50% based on the total dry weight of bentonite clays in the composition and the calcium bentonite comprises about 50% to about 99% based on the total dry weight of bentonite clays in the composition. The combination of sodium bentonite and calcium bentonite clays have a particle size of about 50 microns to about 3350 microns, and preferably about 600 microns to about 3350 microns for best agglomeration and for most effective removal from the litter box. The bentonite clays can be any member of the dioctahedral or trioctahedral smectite group, or a mixture thereof. Examples include Montmorillonite, Beidellite, Nontronite, Hectorite and Saponite; or combinations thereof. The bentonite clays of the present invention also can include Attapulgite or Sepiolite.

In order to achieve the full advantage of the present invention, regardless of the water-swellable bentonite that is used in the litter box absorbent composition, of either embodiment of the present invention, it is preferred that the bentonite clay is not calcined. Calcination results a loss of a portion of the hydroxyl groups from the bentonite clay, and such hydroxyl groups are related to the water-absorption and water-swelling properties of the bentonite clay. Consequently, a calcined bentonite clay, while still able to absorb many times its weight of a liquid, may not swell and agglomerate with nearby wetted and calcined bentonite particles as effectively as uncalcined bentonite particles.

In accordance with another important feature of either embodiment of the present invention, a water-swellable bentonite clay useful in a litter box absorbent composition is present in a particle size ranging from about 50 μ (microns) to about 3350 μ in diameter, and more preferably in a particle size ranging from about 600 μ to about 3350 μ in diameter; or, in other words, in a particle size of from about 6 mesh to about 100 mesh. It has been found that a significant percentage, e.g. 10% by weight of more, of waterswellable bentonite particles appreciably greater than about 3350 μ in diameter do not sufficiently cohesively agglomerate to allow facile physical separation of the wetted, agglomerated mass from the litter box. Furthermore, it has been found that a significant amount, e.g. 10% by weight or more, of water-swellable bentonite particles appreciably smaller than about 50 μ in diameter produce a litter box absorbent composition that is too dusty and forms a muddy, sticky wetted mass of insufficient cohesive strength after partial drying, e.g. about 1 to about 24 hours at room temperature. In order to achieve the full advantage of the present invention, the water-swellable bentonite clay should be present in the composition in particle sizes across the entire range of about 600 μ to about 3350 μ because the smaller diameter water-swellable bentonite particles, e.g. 50 μ to 600 μ upon being wetted, swell and serve as "bridges" between the larger wetted bentonite particles. The overall effect of a predominance of particles within the 600 μ to 3350 μ range that have not been compacted from smaller particles is the production of a sufficiently large wetted mass with excellent physical cohesive strength, even after partial drying, that does not adhere to an animal's paws or fur.

The litter box absorbent composition of the present invention can consist only of a non-compacted water-swellable bentonite clay in the first embodiment; or only of sodium and calcium bentonite clays in the second embodiment, thereby avoiding any extra compounding process steps. In addition, the litter box absorbent composition of the present invention optionally can include perfumes, deodorants, odor absorbents, anti-microbial agents, disinfectants, colorants and pesticides, in an amount sufficient to perform their intended functions substantially without decreasing the water-swellability of the clay. The litter box absorbent composition also can include other typically used litter box absorbents such as other clays, sand, or cellulose-based materials. However, any optionally added ingredient cannot be present in an amount that materially and adversely affects the ability of the water-swellable bentonite clay to absorb liquid dross products and simultaneously agglomerate into a monolithic mass of sufficient size and cohesive strength for physical removal of the soiled and wetted mass from the litter box without a wet, sticky surface. Any optional ingredients and additional absorbents are dry-blended into the water-swellable bentonite clay of the present invention and the water-swellable clay is present in an amount of at least 65% by weight of the composition, and to achieve the full advantage of the present invention and water-swellable clay is present in an amount of at least 90% by weight of the composition.

It should be noted that the animal dross absorbent of the present invention can be used in litter boxes or in cages of animals including, among others, household pets such as cats, dogs, gerbils, guinea pigs, mice and hamsters; other pets such as rabbits, ferrets and skunks; or laboratory animals such as monkeys, mice, rats, goats, horses, cows and sheep. The animal litter absorbent of the present invention is especially useful for smaller animals, such as cats. Furthermore, the water-swellable bentonite clay of the present invention is suitable for other uses in addition to absorbing urine, such as absorbing vomit or absorbing waste liquids in appropriate areas of slaughter houses and meat packing plants.

To demonstrate the new and unexpected results of the first embodiment of the present invention, 454 g. (one pound) of a non-compacted water-swellable sodium bentonite clay having a particle size of 600 microns to 3350 microns was placed in a plastic litter box. The litter box than was used in a house that included 2 cats as household pets. The cats urinated in the litter box at regular intervals, causing the water-swellable bentonite of the present invention to agglomerate into sufficiently large and stable masses for at least daily physical removal, depending upon the quantity of urine and feces deposited in the litter box. The unsoiled water-swellable bentonite was allowed to remain in the litter box for subsequent use, and it was found that the litter box was free of offending odors for 14 days. After this time, the litter box was recharged with more of the non-compacted water-swellable sodium bentonite clay of the present invention.

In comparison, the above-described non-compacted sodium bentonite clay of the present invention was compared to a compacted clay having a particle size of 710 μ to 4000 μ—like that of the Crampton et al. U.S. Pat. No. 4,657,881. The compacted clay was prepared by compressing sodium bentonite into ½ inch tablets by compression in a tablet machine to compact the clay (as disclosed in Crampton et al.). The compacted tablets then were ground very carefully and screened to remove all particles having a size below 710 microns and to remove all particles having a size greater than 4 mm.

A method was developed to evaluate the tendency of cat litters to stick to an animal's paws or fur immediately after the litter is wetted by the animal. For this procedure, 5 mls of 1% NaCl at 50° C. was discharged from a 10 ml pipette into a pan containing the test litter at a minimum depth of one inch. The tip of the pipette is held steady approximately one inch above the litter while it drains. Ten seconds after releasing the NaCl solution into the pan, a pre-weighted piece of 4.25 cm Whatman No. 1 filter paper is placed onto the wetted spot, and a 200 gram weight with a flat bottom face approximately 2.5 cm across is placed on the center of the filter paper. Twenty seconds later, the weight is removed, and the filter paper is lifted from the pan. If the wet clay adheres to the filter paper, this is noted, and the weight of both is determined.

The shape of the wet clay mass is noted, as well as any tendency for the NaCl solution to "puddle" when applied, rather than being immediately absorbed by the clay.

| Sample ID | Paper Wt. (g) | Results: Paper + Clay Wet Wt. (g) | Wet Clay Wt. (g) |
|---|---|---|---|
| non-compacted | | | |
| #1 | 0.14 | 0.17 | ** |
| #2 | 0.12 | 0.14 | ** |
| #3 | 0.11 | 0.15 | ** |
| compacted | | | |
| #1 | 0.12 | 11.55 | 11.43 |
| #2 | 0.12 | 11.88 | 11.76 |
| #3 | 0.12 | 11.65 | 11.53 |

Comments:
The compacted granular litter prepared by reducing compressed bentonite showed slow absorption of the NaCl solution and puddling, formed thin, pancake shaped clay masses, and was very sticky. The non-compacted litter absorbed the liquid quickly, and formed rounded, cohesive masses that felt relatively dryer on the surface.
**No non-compated litter adhered to the filter paper. Weight increase is from salt solution only.

To demonstrate the new and unexpected results of the second embodiment of the present invention, 454 g. (one pound) of a combination of non-compacted sodium bentonite and non-compacted calcium bentonite clays of the present invention having an overall particle size in the range of 600 microns to 3350 microns (25% by weight sodium bentonite and 75% by weight calcium bentonite) was placed in a plastic litter box. The litter box then was used in a house that included 2 cats as household pets. The cats urinated in the litter box at regular intervals, causing the bentonite clays of the present invention to agglomerate into sufficiently large and stable masses for at least daily physical removal, depending upon the quantity of urine and feces deposited in the litter box. The agglomerates were dropped onto the top of water contained in a household toilet and within 30 seconds or less completely disperse in the toilet water and are flushed to a sewer without plumbing clogging. The unsoiled bentonite clays were allowed to remain in the litter box for subsequent use, and it was found that the litter box was free of offending odors for 14 days. After this time, the litter box was recharged with more of the sodium and calcium bentonite clay composition of the present invention.

At the user's option, the litter box could be completely cleaned, or an additional amount of the water-swellable bentonite clay could be added to the small amount of remaining, unsoiled bentonite clay without cleaning the litter box because no offensive odors were being generated. In contrast, present day animal litter absorbents generate a sufficient amount of offensive odors such that the litter box must be cleaned at least weekly, and usually at least twice weekly.

Obviously, many modifications and variations of the invention as hereinbefore set forth can be made without departing from the spirit and scope thereof and therefore only such limitations should be imposed as are indicated by the appended claims.

What is claimed and sought to be secured by Letters Patent is:

1. A litter box comprising a water-impermeable receptacle having disposed therein a non-water-absorbent polymer-containing absorbent composition capable of agglomerating upon wetting into a mass of sufficient size and of sufficient cohesive strength for physical removal of the agglomerated mass from the litter box, said agglomerated mass capable of being removed from the litter box substantially as said formed agglomerated mass after drying at room temperature for about 24 hours without substantial removal of unsoiled particles, said absorbent composition comprising at least about 65% by weight particles of sodium bentonite clay, wherein at least 80% by weight of the clay particles have a particle size ranging from about 50 microns to about 3350 microns, and wherein less than 10% by weight of said particles are larger than about 3350 microns.

2. The litter box of claim 1, wherein the absorbent composition comprises at least about 90% by weight particles of sodium bentonite clay.

3. The litter box of claim 1, wherein the particles of sodium bentonite clay are non-compacted particles.

4. The litter box of claim 2, wherein the particles of sodium bentonite clay are non-compacted particles.

5. The litter box of claim 1, wherein the sodium bentonite clay particles are sized predominantly in the range of about 600 microns to about 3350 microns.

6. A litter box comprising a water-impermeable receptacle having disposed therein an absorbent composition capable of agglomerating upon wetting into a mass of sufficient size and of sufficient cohesive strength for physical removal of the agglomerated mass from the litter box, said agglomerated mass capable of being removed from the litter box substantially as said formed agglomerated mass after drying at room temperature for about 24 hours without substantial removal of unsoiled particles, said absorbent composition comprising particles of a water-swellable sodium bentonite clay and wherein the adsorbent composition comprises at least about 65% by weight particles of sodium bentonite clay, wherein at least 80% by weight of the clay particles have a particle size ranging from about 50 microns to about 3350 microns, and wherein less than 10% by weight of said particles have a size smaller than about 50 microns.

7. The litter box of claim 6, wherein the absorbent composition comprises at least about 90% by weight particles of sodium bentonite clay.

8. The litter box of claim 6, wherein the particles of sodium bentonite clay are non-compacted particles.

9. The litter box of claim 7, wherein the particles of sodium bentonite clay are non-compacted particles.

10. A litter box comprising a water-impermeable receptacle having disposed therein an absorbent composition capable of agglomerating upon wetting into a mass of sufficient size and of sufficient cohesive strength for physical removal of the agglomerated mass from the litter box, said agglomerated mass capable of being removed from the litter box substantially as said formed agglomerated mass after drying at from temperature for about 12 to 24 hours without substantial removal of unsoiled particles, said absorbent composition comprising non-compacted particles of a water-swellable sodium bentonite clay and wherein the composition comprises at least about 65% by weight particles of sodium bentonite clay, wherein at least 80% by weight of the clay partices have a particle size ranging from about 50 microns to about 3350 microns, and wherein less than 10% by weight of said particles are larger than about 3350 microns.

11. The litter box of claim 10, wherein the absorbent composition comprises at least about 90% by weight particles of sodium bentonite clay.

12. The litter box of claim 10, wherein the particles of sodium bentonite clay are non-compacted particles.

13. The litter box of claim 11, wherein the particles of sodium bentonite clay are non-compacted particles.

14. A litter box comprising a water-impermeable receptacle having disposed therein a non-water-absorbent polymer-containing absorbent composition capable of agglomerating upon wetting into a mass of sufficient size and of sufficient cohesive strength for physical removal of the agglomerated mass from the litter box, said agglomerated mass capable of being removed from the litter box substantially as said formed agglomerated mass after drying at room temperature for about 24 hours without substantial removal of unsoiled particles, said absorbent composition comprising at least about 65% by weight particles of sodium bentonite clay, wherein at least 80% by weight of the clay particles have a particle size ranging from about 50 microns to about 3350 microns, and wherein less than 10% by weight of said particles are larger than about 3350 microns.

15. The litter box of claim 14, wherein the absorbent composition comprises at least about 90% by weight particles of sodium bentonite clay.

16. The litter box of claim 14, wherein the particles of sodium bentonite clay are non-compacted particles.

17. The litter box of claim 15, wherein the particles of sodium bentonite clay are non-compacted particles.

18. A method of selectively removing liquid animal dross from a litter box comprising:

contacting a water-absorbent composition comprising at least about 65% by weight sodium bentonite clay particles with the liquid animal dross, wherein at least 80% by weight of said clay particles have a size ranging from about 50 microns to about 3350 microns, and wherein less than 10% by weight of said clay particles have a particle size larger than about 3350 microns, thereby producing an agglomerated mass comprising the absorbent composition and the liquid animal dross that is of sufficient size and of sufficient cohesive strength to be removed from the litter box; and removing essentially only the agglomerated mass from the litter box substantially as said formed agglomerated mass, after said agglomerated mass has dried at room temperature for a period of at least about 12 hours, without substantial removal of unsoiled particles, thereby removing the liquid animal dross from the litter box.

19. The method of claim 18, wherein the absorbent composition comprises at least about 90% by weight particles of sodium bentonite.

20. The method of claim 12, wherein the particles of sodium bentonite clay are non-compacted particles.

21. The method of claim 19, wherein the particles of sodium bentonite clay are non-compacted particles.

22. The method of claim 18, wherein the sodium bentonite clay particles are sized predominantly in the range of about 600 microns to about 3350 microns.

23. A method of selectively removing liquid animal dross from a litter box comprising:

contacting a water-absorbent composition comprising at least about 65% by weight sodium bentonite clay particles with the liquid animal dross, wherein at least 80% by weight of said clay particles have a size ranging predominantly from about 50 microns to about 3350 microns, and wherein less than 10% by weight of said clay particles have a particle size smaller than about 50 microns, thereby producing an agglomerated mass comprising the absorbent composition and the liquid animal dross that is of sufficient size and of sufficient cohesive strength to be removed from the litter box substantially as said formed agglomerated mass; and removing the agglomerated mass from the litter box, after said agglomerated mass has dried at room temperature for a period of about 12 to about 24 hours, without substantial removal of unsoiled particles, thereby removing the liquid animal dross from the litter box.

24. The method of claim 23, wherein the absorbent composition comprises at least about 90% by weight particles of sodium bentonite.

25. The method of claim 23, wherein the particles of sodium bentonite clay are non-compacted particles.

26. The method of claim 24, wherein the particles of sodium bentonite clay are non-compacted particles.

27. A method of selectively removing liquid animal dross from the litter box comprising:

contacting a water-absorbent composition comprising at least about 65% by weight sodium bentonite clay particles with the liquid animal dross, wherein at least 80% by weight of said clay particles have a size ranging from about 50 microns to about 3350 microns, and wherein less than 10% by weight of said clay particles have a particle size layer than about 3350 microns, thereby producing an agglomerated mass comprising the absorbent composition and the liquid animal dross that is of sufficient size and of sufficient cohesive strength to be removed from the litter box without substantial adherence to an animal; and removing the agglomerated mass from the litter box after said agglomerated mass has dried at room temperature for a period of about 24 hours, thereby removing the liquid animal dross from the litter box.

28. The of claim 27, wherein the absorbent composition comprises at least about 90% by weight particles of sodium bentonite.

29. The method of claim 27, wherein the particles of sodium bentonite clay are non-compacted particles.

30. The method of claim 28, wherein the particles of sodium bentonite clay are non-compacted particles.

31. The method of claim 27, wherein less than 10% of said particles have a particle size smaller than about 50 microns.

* * * * *

UNITED STATES PATENT AND TRADEMARK OFFICE
CERTIFICATE OF CORRECTION

PATENT NO. : 5,503,111
DATED : April 2, 1996
INVENTOR : JOHN HUGHES

It is certified that error appears in the above-identified patent and that said Letters Patent is hereby corrected as shown below:

Column 3, line 10, "of mineral" should be -- of the mineral --.

Column 9, line 27, "weight of more," should be -- weight or more, --.

Column 10, line 26, "box than was" should be -- box then was --.

Column 11, line 20, "non-compated" should be -- non-compacted --.

Column 13, line 43, "claim 12," should be -- claim 18, --.

Column 14, line 32, "size layer" should be -- size larger --.

Signed and Sealed this

Sixth Day of May, 1997

Attest:

BRUCE LEHMAN

Attesting Officer

Commissioner of Patents and Trademarks